United States Patent [19]
Bruckert et al.

[11] Patent Number: 5,781,583
[45] Date of Patent: Jul. 14, 1998

[54] METHOD AND SYSTEM FOR COMMUNICATION OVER MULTIPLE CHANNELS IN A SPREAD SPECTRUM COMMUNICATION SYSTEM

[75] Inventors: Eugene J. Bruckert, Arlington Heights; Thomas A. Sexton, Schaumburg, both of Ill.

[73] Assignee: Motorola, Inc., Schaumburg, Ill.

[21] Appl. No.: 589,177

[22] Filed: Jan. 19, 1996

[51] Int. Cl.$^6$ .............................. H04B 1/707; H04J 13/04
[52] U.S. Cl. ...................... 375/206; 375/200; 375/208; 370/342
[58] Field of Search .......................... 375/200, 205, 375/206, 208, 209, 210; 370/208, 209, 335, 342, 441, 479

[56] References Cited

U.S. PATENT DOCUMENTS

| | | | |
|---|---|---|---|
| 5,204,876 | 4/1993 | Bruckert et al. | 375/200 |
| 5,235,614 | 8/1993 | Bruckert et al. | 370/209 |
| 5,471,497 | 11/1995 | Zehavi | 375/200 |

OTHER PUBLICATIONS

MDMC Proceedings, Nov. 21–22, 1994, Japan, "Multiple Access Performance of Parallel Combinatory Spread Sprectrum Communication Systems in Multipath Fading Channels", by S. Sasaki, et al.

"Computer Image Processing and Recognition", Ernest L. Hall, Academic Press, Inc. 54–59; 138–142, 1979.

"Digital Communications", John G. Proakis, p. 249, McGraw Hill Book Company, 1983.

Primary Examiner—Stephen Chin
Assistant Examiner—Jeffrey W. Gluck
Attorney, Agent, or Firm—Heather L. Creps

[57] ABSTRACT

A method for transmitting a communication signal (20) having a data rate over a plurality of spread spectrum traffic channels includes determining a first number of traffic channels required to transmit the communication signal at the data rate, and determining a second number of traffic channels (502) available for transmitting the communication signal (20). In response to a comparison of the first number of traffic channels to the second number of traffic channels, a first traffic channel (54) for transmitting a first portion of the communication signal (50, 51) and a second traffic channel (56) for transmitting a second portion of the communication signal (52, 53) are selected from the second number of traffic channels (502). The selection of the first traffic channel (54) is non deterministic of the selection of the second traffic channel (56).

26 Claims, 3 Drawing Sheets

METHOD AND SYSTEM FOR COMMUNICATION OVER MULTIPLE CHANNELS IN A SPREAD SPECTRUM COMMUNICATION SYSTEM

FIELD OF THE INVENTION

This invention relates generally to spread spectrum communication systems, and, more particularly, to a method and system for communication over multiple channels in a spread spectrum communication system.

BACKGROUND OF THE INVENTION

In a typical cellular radio frequency (RF) communications system such as a radiotelephone system, a base station employing transmitters and receivers communicates with multiple mobile stations operating within an area served by the base station.

Multiple access wireless communication between the base station and the mobile stations occurs via RF channels which provide paths over which communication signals such as voice, data and video are transmitted.

Base-to-mobile station communications are said to occur on a forward or down-link channel, while mobile-to-base station communications are referred to as being on a reverse or up-link channel. Channels used for propagating user communication signals are commonly referred to as traffic channels, while channels dedicated to signaling and other system overhead may be referred to as signaling channels.

Well known RF channelization techniques include frequency division multiple access (FDMA), time division multiple access (TDMA) and code division multiple access (CDMA).

A communication system using CDMA channelization is described in detail in TIA/EIA Interim Standard IS-95, Mobile Station-Base Station Compatibility Standard for Dual-Mode Wideband Spread Spectrum Cellular System, Telecommunications Industry Association, Washington, D.C. July 1993, incorporated herein by reference. A CDMA communication system is referred to as a spread spectrum system because a communication signal originating at a base or mobile station is modulated and transmitted over a much wider frequency band than the bandwidth of the original communication signal. That is, the data rate of the modulated communication signal when transmitted is much higher than the baseband data rate of the original communication signal.

A CDMA communication system is a direct sequence (DS) system when the baseband data rate of the original communication signal is increased by modulating the original communication signal with specialized codes called spreading codes. IS-95 is a DS-CDMA system which provides a maximum baseband data rate of 9600 bits per second for each original communication signal, and a post-modulation data rate of 1.2288 Mbits per second for the corresponding transmitted communication signal.

All users of a DS-CDMA communication system such as IS-95 transmit and receive communication signals over a common frequency spectrum, and specialized codes may, in addition to increasing the data rate of a communication signal, also be used for separating multiple communication signals from one another in the system. Each specialized code typically represents one communication channel within the common frequency spectrum.

Figures 1, 2:
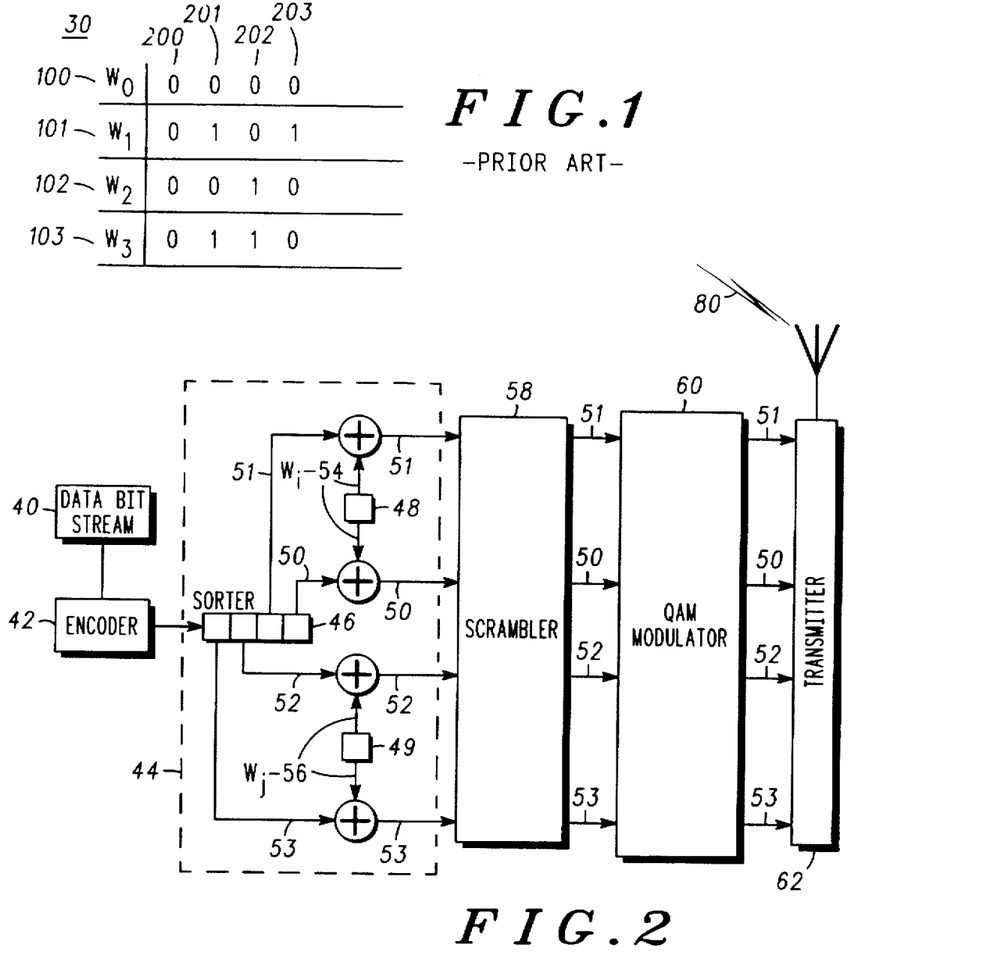
FIG. 1 is a Hadamard matrix including 4 rows and 4 columns, each row and column representing a 4-chip Walsh cover.
FIG. 2 illustrates a block diagram of a forward channel waveform design for a high data rate communication signal in a DS-CDMA communication system in accordance with a preferred embodiment of the present invention.

Walsh covers serve as forward communication channel identifiers in the IS-95 system, each Walsh cover generally representing one communication channel. A Walsh cover corresponds to a single row or column of a Hadamard matrix, a square matrix of chips (i.e., bits) with a dimension that is always a power of two. A Hadamard matrix 30 including 4 rows W0–W3 100–103 and 4 columns 200–203 is shown in FIG. 1, each row W0–W4 100–103 and column 200–203 representing a 4-chip Walsh cover. A Hadamard matrix comprising the Walsh covers used in IS-95 (not shown) is a 64-by-64 matrix having rows W0 through W63. A detailed discussion of Hadamard matrices is given in John G. Proakis, *Digital Communications*, 1st Ed., p. 249 (1983), incorporated herein by reference.

Prior to transmission of a communication signal over an IS-95 forward channel, the communication signal is encoded, interleaved, scrambled by a pseudorandom noise (PN) code, bi-phase shift key (BPSK) modulated with a 64-chip Walsh cover identifying the particular forward channel used for transmission of the signal, and quadrature phase shift key (QPSK) modulated into composite I and Q components by a pair of PN codes with an assigned time offset.

A transmitted communication signal which has been modulated with a 64-chip Walsh cover serving as a channel identifier may be demodulated by a conventional receiver which correlates a received signal with the particular Walsh cover used to modulate the communication signal. This correlation is generally known to those skilled in the art, and comprises adding or subtracting bits of the Walsh cover according to an algorithm which is dependent on the particular Walsh cover used for modulation of the communication signal. Thus, for each 64-chip Walsh cover, 63 complex additions are typically performed to demodulate one communication signal bit.

It has been proposed in the art to allow for variable rate signal transmission in a spread spectrum communication system. For example, U.S. Pat. No. 5,471,497 to Zehavi ("Zehavi") describes, among other things, an apparatus and method for communication of information at data rates higher than 9600 bits per second over communication channels in a CDMA system.

Zehavi discloses using orthogonal coset code sets, i.e., rows of a Hadamard matrix, in conjunction with a Walsh cover generator to assign an initial coset code and a Walsh cover W (i.e., an initial channel) to a first pair of information substreams. Subsequent pairs of information substreams (i.e., channels) are identified by coset codes and the Walsh cover W, the subsequent coset codes having predetermined relationships with respect to the first assigned coset code. A receiver digitizes a received signal and, among other things, demodulates the signal to retrieve the original information substreams. Estimates of the information bits in each information substreams are obtained by performing correlations based on the orthogonal coset codes and Walsh cover W used to encode the input symbol streams.

After Walsh cover correlation is performed, the resulting coset-coded data is converted from a serial to parallel format and is input to a Fast Hadamard Transform (FHT) having a number inputs equal to a number of original information substreams. The number of inputs to the FHT is also equal to a number of rows and columns of elements in the FHT. A detailed discussion of Hadamard transforms is provided in Ernest L. Hall, *Computer Image Processing and Recognition*, Chapter 3, sec. 3.3.3, pp. 138–143 (1979), incorporated herein by reference.

This method of channel assignment for a high data rate communication described above results in the assignment of a number of coset codes and a Walsh cover to a user communication by a predetermined algorithm, and generally eliminates a number of channels (i.e., a number of Walsh covers) from being used by other user communications simultaneously. Thus, one or more channels which may be needed for assignment to a new user's communication being set-up according to a similar predetermined algorithm may already be in use by the communication system, and therefore not available for assignment to the new user.

This problem is exacerbated during soft hand-off of a call, when two base stations must each assign multiple channels to the same communication signal.

Thus, there is a need for a system and method for assigning multiple traffic channels to a single high data rate communication signal in a direct sequence spread spectrum communication system where an identity of one traffic channel used for the multiple channel communication is not deterministic of an identity of another traffic channel.

There is a further need for an efficient method for demodulating a multiple channel communication where the identity of one channel is not deterministic of an identity of another channel.

SUMMARY OF THE INVENTION

According to an aspect of the present invention, the foregoing problems are ameliorated by a method for transmitting a communication signal having a data rate over a plurality of spread spectrum traffic channels, which includes determining a first number of traffic channels required to transmit the communication signal at the data rate and determining a second number of traffic channels available for transmitting the communication signal. In response to a comparison of the first number of traffic channels to the second number of traffic channels, a first traffic channel for transmitting a first portion of the communication signal and a second traffic channel for transmitting a second portion of the communication signal are selected from the second number of traffic channels. The selection of the first traffic channel is non deterministic of the selection of the second traffic channel. By non deterministic it is meant that the second traffic channel is selected from among the remaining channels in the second number of channels, that is, conditionally independent of the selection of the first traffic channel.

In accordance with another aspect of the present invention, a method for handing off a communication signal in a spread spectrum communication system includes transmitting the communication signal by a first communication unit over a first group of traffic channels and determining by a second communication unit a number of traffic channels available for transmitting the communication signal by the second communication unit. When the number of traffic channels available for transmitting the communication signal by the second communication unit is greater than or equal to a number of channels in the first group of traffic channels, the communication signal is monitored by the second communication unit over a second group of traffic channels. The communication signal is then transmitted by the second communication unit over the second group of traffic channels.

In accordance with a further aspect of the present invention, a spread spectrum communication system includes a first central communication unit responsive to a mobile communication unit over a first plurality of traffic channels and a first controller associated with the first central communication unit operable for assigning a first group of traffic channels for transmitting and receiving a communication signal. The first group of traffic channels includes a first traffic channel and a second traffic channel chosen from the first plurality of traffic channels. The first traffic channel is non deterministic of the second traffic channel.

In accordance with a still further embodiment of the present invention, a method for receiving a modulated communication signal transmitted over a plurality of traffic channels in a spread spectrum communication system, each of the plurality of traffic channels being associated with a code having a plurality of groups of chips, includes inputting the modulated communication signal to a decoder representative of a number of logical rows of adders and a number of logical columns of adders, the number of logical rows of adders and the number of logical columns of adders being larger than a number of traffic channels in the plurality of traffic channels. The modulated communication signal is demodulated based on a first group of chips of a first code associated with at least one of the plurality of traffic channels, to form a first partially demodulated communication signal, and demodulated based on a second group of chips of a second code associated with at least one of the plurality of traffic channels, to form a second partially demodulated communication signal. The first partially demodulated communication signal and the second partially demodulated signal are combined.

Other advantages of the present invention will become readily apparent to those skilled in the art from the following description of the preferred embodiments of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENT

Turning now to the drawings, wherein like numerals designate like components, FIG. 2 illustrates a block diagram of a forward channel waveform design, such as used in communication from an IS-95 base station to an IS-95 mobile station, for a high data rate communication signal in a DS-CDMA communication system.

A high data rate communication signal (not shown) such as voice, data, video or a combination of these, is converted to a data bit stream 40 (i.e., a series of data bits), and is input to an encoder block 42 at a rate higher than 9600 bits per second, for example, 38,400 bits per second. Using known methods, encoder block 42 encodes data bit stream 40 at a fixed encoding rate using algorithms which facilitate subsequent decoding of the data symbols back into data bits.

Encoder block 42, which may further include an interleaver (not shown), organizes the data symbols into frames of a predetermined size according to conventional methods. If desired, reference bits may be inserted periodically within the interleaved data symbol stream to further facilitate decoding of the data symbols.

The data symbols output from encoder block 42 are prepared for transmission over multiple communication channels by a modulator block 44. Within modulator block 44, a sorter 46 demultiplexes the data symbols, dividing the data symbols into data rails 50–53. As shown, sorter 46 separates the data symbols into four data rails 50–53, but a larger or smaller number of data rails is possible, depending on the data rate of the data bit stream 40.

Data rails 50–53 output from sorter 46 may be divided into groups such as pairs. As shown, a first pair of data rails 50–51 is bi-phase shift key (BPSK) modulated with a first code such as a Walsh cover Wi 54 having length L, chosen from a list of available Walsh covers in the communication system, by a Walsh cover generator 48. The BPSK modulation may be performed according to conventional methods.

Subsequent pairs of data rails may also be bi-phase shift key modulated by different codes such as Walsh covers having lengths L, also chosen from a list of available Walsh covers in the communication system. An identity of each Walsh cover chosen is preferably independent of an identity of any previously chosen Walsh cover. One way to ensure that the first Walsh cover selected is non deterministic of the subsequently chosen Walsh covers is to choose the covers arbitrarily or randomly. As shown, data rails 52–53 are modulated with Walsh cover Wj 56 by Walsh cover generator 49.

This method of channel assignment, where Walsh covers for a high data rate communication signal are assigned arbitrarily or randomly from a list of available Walsh covers in the communication system, is an improvement over algorithmic channel assignment methods. For example, in an algorithmic channel assignment scheme, one or more of the Walsh covers assigned to the communication according to the algorithm may already be in use by the communication system.

At scrambler blocks 58, data rails 50–53 are all scrambled by the same synchronized short pseudorandom noise (PN) sequence according to well-known scrambling techniques. Alternatively, individual inputs to scrambler block 58 may not necessarily be acted on by the same sequence. Data rails 50–53 are subsequently input to a quadrature amplitude modulator (QAM) block 60, which utilizes a quadrature amplitude modulation process such as quadrature phase shift key modulation or another modulation process to modulate data rails 50–53 according to well-known methods. Finally, transmitter block 62 operates on data rails 50–53 by summing, upsampling, transmit filtering, upbanding and broadcasting them to form a modulated communication signal 80 according to conventional methods.

Figure 3:
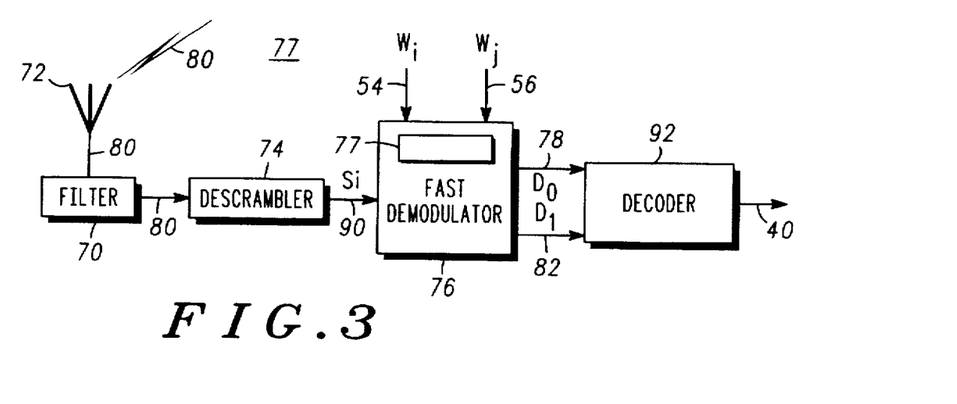
FIG. 3 illustrates a block diagram of a receiver for receiving a high data rate communication signal transmitted over multiple DS-CDMA channels in accordance with FIG. 2.

FIG. 3 illustrates a block diagram of a receiver for receiving a high data rate communication signal transmitted over multiple DS-CDMA traffic channels as described in connection with FIG. 2. After being received by antenna 72 and passing through filter 70, modulated communication signal 80 is descrambled by conventional methods at descrambler block 74. Descrambler block 74 removes the scrambling sequence or sequences applied by scrambler block 58. A descrambled communication signal Si 90 is input to fast demodulator block 76. The descrambled communication signal Si 90 may correspond to a pairwise summation of data rails 50,51 and data rails 52, 52.

Fast demodulator block 76 demodulates descrambled communication signal 90 which, as shown, has been BPSK modulated with Walsh covers Wi 54 and Wj 56 (discussed in connection with FIG. 2). Fast demodulator block 76, which preferably includes a decoder 77 such as a Hadamard decoder having a fixed number of logical rows of adders equal to the length L of Walsh covers Wi 54 and Wj 56 and a fixed number of logical columns of adders equal to logarithm base two of the length L of Walsh covers Wi 54 and Wj 56, utilizes a correlation algorithm which jointly demodulates Walsh cover Wi 54 and Wj 56 using partial sums (discussed below).

A Hadamard decoder may be implemented using commercially available hardware as an array of adders or as a multiplexed adder, depending on the dimension of the decoder. For example, for a decoder of small dimension, an array of adders may be used, so that the number of rows of adders in the array is equal to the length of the Walsh covers to be decoded. For a large decoder, however, a multiplexed adder may be designed, so that the multiplexed adder is merely representative of the number of logical rows equal to the length of the Walsh covers to be decoded.

Alternatively, a Hadamard decoder may be implemented within a receiver utilizing a conventional digital signal processor (DSP) such as Motorola part no. 56166. The DSP, working in conjunction with a computer-readable memory storing an array of data points logically representing the rows and columns of adder outputs, performs specific additions according to a predetermined method for calculating partial sums (examples of partial sum caluculations are discussed below).

Figure 4:
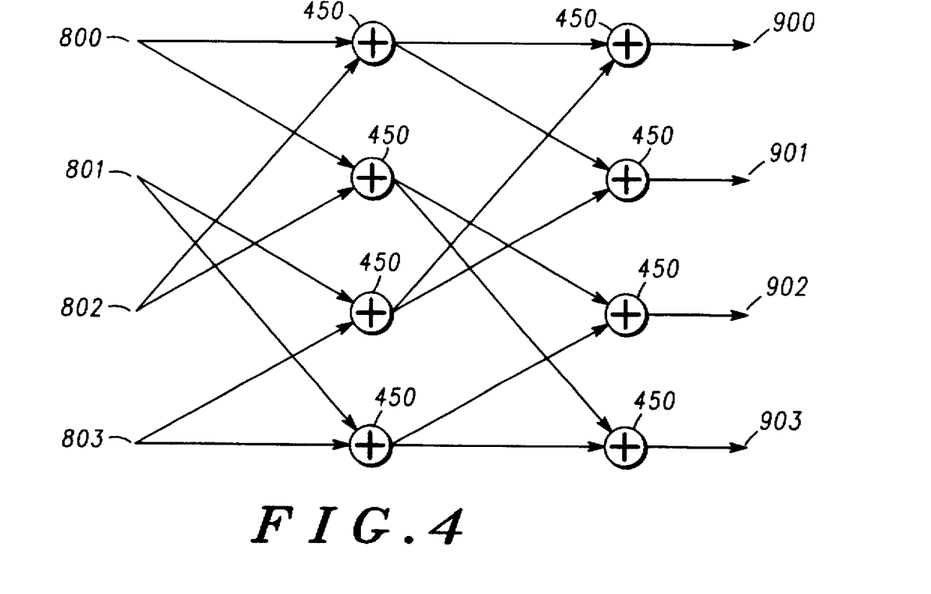
FIG. 4 is a conceptual drawing of a four-by-four Hadamard decoder according to a preferred embodiment of the present invention.

A conceptual drawing of a four-by-four Hadamard decoder 77 is shown in FIG. 4. As shown, logical representations of rows and columns of adders 450 are available to simultaneously demodulate a signal (not shown) appearing at input paths 800–803. The signal appearing at input paths 800–803 represents one, two, three or four data streams, each data stream represented including data symbols having been BPSK modulated by one of four Walsh covers of four chips in length (discussed in connection with FIG. 1). Outputs 900–903 may be elements in a demodulated data stream, or noise.

For example, referring to FIG. 1, if Walsh cover W0 100 was assigned to modulate the signal appearing at input paths 800–803 shown in FIG. 4 and no other Walsh codes were assigned (i.e., the signal represents only one data stream), then output 900 represents a data symbol in the demodulated data stream at each sampling time, and outputs 901–903 are noise. On the other hand, if Walsh covers W0–W2 100–102 (depicted in FIG. 1) were assigned to modulate the signal appearing at input paths 800–803 shown in FIG. 4 (i.e., the signal represents three data streams), then outputs 900–902 represent data symbols in demodulated data streams at each sampling time, and output 903 is noise.

By utilizing partial sums, the number of complex additions required (that is, the number of adders turned "on" in the Hadamard decoder) to recover each data symbol is minimized. Reducing the number of complex additions performed results in decoder current drain being reduced. The correlation algorithm, and hence the number of complex additions or adders utilized to recover each data symbol, is determined by the identities of the particular Walsh covers used to modulate the signal, such as spread communication signal 80, shown in FIG. 3.

Still referring to FIG. 3, consider a first example of partial sum demodulation by a Hadamard decoder. Suppose that Wi 54 is W0, a 64-chip Walsh cover represented by 64 zeroes, and that Wj 56 is W1, a 64-chip Walsh cover where even chips are zeroes and odd chips are ones. Partial sums $S_0$ and $S_1$ may be formed by fast demodulator 76 using descrambled communication signal Si 90 as follows:

$$S_0 = \sum_{i=0,even}^{62} S_i$$

$$S_1 = \sum_{i=1,odd}^{63} S_i$$

Then, $S_0$ and $S_1$ are combined to give an output $D_0$ 78 corresponding to one data symbol BPSK modulated by Wi 54 and an output bit $D_1$ 82 corresponding to one data symbol BPSK modulated by Wj 56 as follows:

$D_0 = S_0 + S_1$
$D_1 = S_0 - S_1$

As a result of using partial sums $S_0$ and $S_1$, the number of complex additions per output data symbol 78, 82 is 32 rather than the 63 required for a conventional IS-95 demodulation operation.

To recover initial data bit stream 40, outputs 78, 82 are deinterleaved and decoded at block 92 according to conventional methods.

In a second example, suppose that W0, W13 and W45 of a 64-by-64 Hadamard matrix are the assigned Walsh covers for a high data rate communication. As is known, W45 has a complicated pattern of 1's and 0's. Let b be the 4 bit sequence {0, 1, 0, 1}, and B={1, 0, 1, 0}. Then W45= bBBbbBBbBbbBBbbB, where juxtaposition of these sequence variables creates a concatenated sequence. Thus, the 64 bit sequence consists of 16 4-bit sequences.

There are two ways to operate the fast demodulator 76 for this example. According to a first method, data symbols modulated by W0 and W13 may be demodulated as described in connection with the first example, and W45 may be despread conventionally. Then the total number of complex additions would be 2*32+63, or 127. Thus, to retrieve each output data symbol would require approximately 43 complex additions.

According to a second method, a first step results in 2*16 additions being performed as follows:

Thirty-two (32) partial sums are formed to exploit short term correlations of the following patterns:

$S_{j,45,even} = s_{2j+0} + s_{2j+2}; j=0,2,4, \ldots 30$ $S_{j,45,odd} = s_{2j+1} + s_{2j+3}; j=0,2,4, \ldots 30$ In a second step, the partial sums from the first example are recovered resulting in 2*15 additions as follows:

$$S_0 = \sum_{i=0,even}^{32} S_{j,45,even}$$

$$S_1 = \sum_{i=0,even}^{32} S_{j,45,odd}$$

A third step resulting in 2*1 additions is performed as follows:

$D_0 = S_0 + S_1$
$D_1 = S_0 - S_1$

Finally, a fourth and final step producing 31 additions is performed as follows:

$$\begin{aligned}D_{45} = & S_{0,45,even} - S_{0,45,odd} - (S_{2,45,even} - S_{2,45,odd}) - \\ & (S_{4,45,even} - S_{4,45,odd}) + (S_{6,45,even} - S_{6,45,odd}) + \\ & (S_{8,45,even} - S_{8,45,odd}) - (S_{10,45,even} - S_{10,45,odd}) - \\ & (S_{12,45,even} - S_{12,45,odd}) + (S_{14,45,even} - S_{14,45,odd}) - \\ & (S_{16,45,even} - S_{16,45,odd}) + (S_{18,45,even} - S_{18,45,odd}) + \\ & (S_{20,45,even} - S_{20,45,odd}) - (S_{22,45,even} - S_{22,45,odd}) - \\ & (S_{24,45,even} - S_{24,45,odd}) + (S_{26,45,even} - S_{26,45,odd}) + \\ & (S_{28,45,even} - S_{28,45,odd}) - (S_{30,45,even} - S_{30,45,odd})\end{aligned}$$

Thus, a total number of additions required for the second method is 95, or approximately 32 additions per output data symbol.

As a third example, suppose that W0, W1, W45 and W2 are used to modulate a high data rate communication signal. In this case, examples one and two may be used to jointly demodulate W0 and W2, while doing a separate joint demodulation of W1 and W45. Again, the number of complex additions would be reduced from 63 to about 32.

In a fourth example, assume that W0, W1 and W2 are used to modulate a high data rate communication signal. There are no partial sums or subpatterns shared between these three Walsh covers. One possible solution is to demodulate W0 and W1 according to the method of the first example, and to demodulate W2 conventionally. Then a total number of additions would be 64+63, or about 40 complex additions per output data symbol. Even for this poor choice of Walsh covers, the additions required per output has been reduced from 63 required by the conventional method of Walsh cover demodulation, to approximately 40.

As will be appreciated by one skilled in the art, a receiver having multiple receiving portions such as a well-known RAKE receiver may be used to achieve space diversity. In addition, it will be understood that RAKE receiver fingers performing searching functions as well as early and late timing functions in accordance with the principles of the present invention will facilitate demodulation of all of the data symbols for the various Walsh covers.

Figure 5:
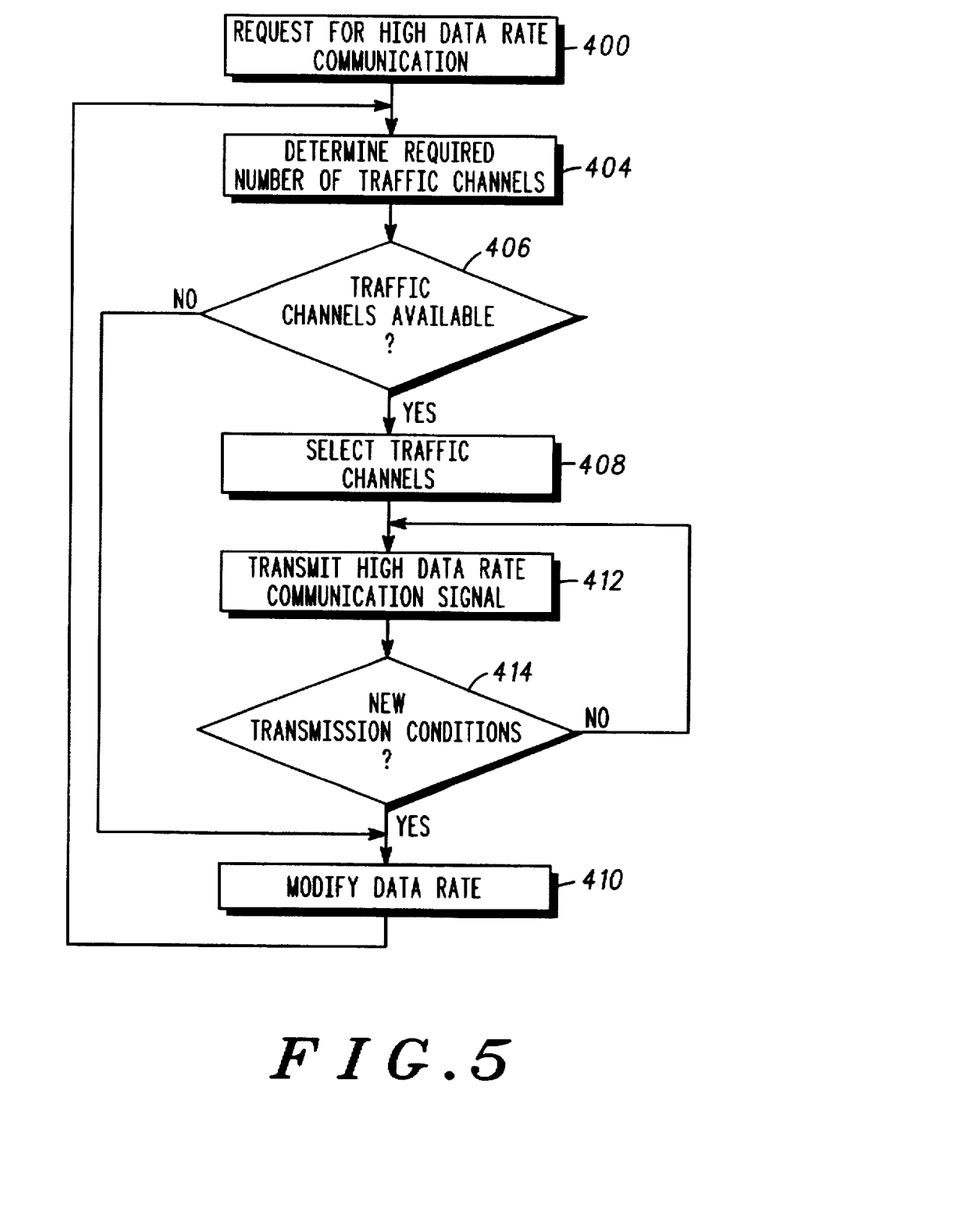
FIG. 5 diagrams a call flow for a high data rate communication signal in a DS-CDMA communication system according to a preferred embodiment of the present invention.

FIG. 5 diagrams a call flow for a high data rate communication signal in a DS-CDMA communication system according to the preferred embodiment of the present invention. Upon receiving a request for a communication having a high data rate at block 400 from a communication unit such as a mobile station (not shown), a communication unit such as a base station or a central communication unit (not shown) calculates a number of traffic channels required to transmit the communication signal at the requested data rate at block 404.

If it is determined at block 406 that the required number of traffic channels is available within the communication system, the base station may select the channels for transmitting the communication signal from a list of the available channels at block 408. If desired, channel selection may be performed in an arbitrary fashion from the list of available channels. If the required number of traffic channels is not available within the communication system, the data rate of the communication signal is modified, for example, lowered, at block 410, and the process is repeated from block 404 until the base station determines that the number of channels required to transmit the communication signal at the modified data rate is available within the communication system.

After the high data rate communication signal has been transmitted at block 412, certain transmission conditions detected at block 414 may cause the number of channels utilized by the high data rate communication signal to change. For example, the quality of the signal may have changed, necessitating an increase or decrease in the number of traffic channels used by the communication signal. In another example, more traffic channels may have become available so that it is possible to transmit a modified-data rate communication signal at the initially requested data rate. In a further example, the mobile station may have reported a new base station as a soft hand-off candidate, and the new base station may not have available the number of traffic channels required to transmit the communication signal at its existing data rate. In a still further example, the data rate of the communication signal itself may vary.

In each case where changed conditions detected at block 414 cause the number of traffic channels transmitting the high data rate communication signal to change, the data rate is modified in accordance with the changed conditions at block 410, and the above-outlined steps are repeated from block 404. In a hard hand-off case, the switchover time of both a mobile station and a base station to a new set of traffic channels may be accounted for in the communication signal data stream, so that no bits are lost in the transition. For example, data transmission may be suspended during the transition. In addition, a base station may send a control message to a mobile station indicating the new channel order for incoming data. A simple algorithm that eliminates the need to communicate the data order is to put the first bit group in the lowest numbered traffic channel, the next group into the next lowest traffic channel, and so on.

In the case where the data rate of the communication signal itself varies, for example, during a video transmission when there is no movement of the video image or during an internet transmission when the data arrives in bursts, traffic channels may be released so that they are available for use by other communications. Alternatively, extra bits may be added to the communication to maintain the initially selected number of traffic channels. A combination of reserving some traffic channels and releasing others is also possible. When the data rate of the communication signal returns to its nominal rate, a number of traffic channels equal to a number of released traffic channels may be re-allocated to the communication signal.

Figure 6:
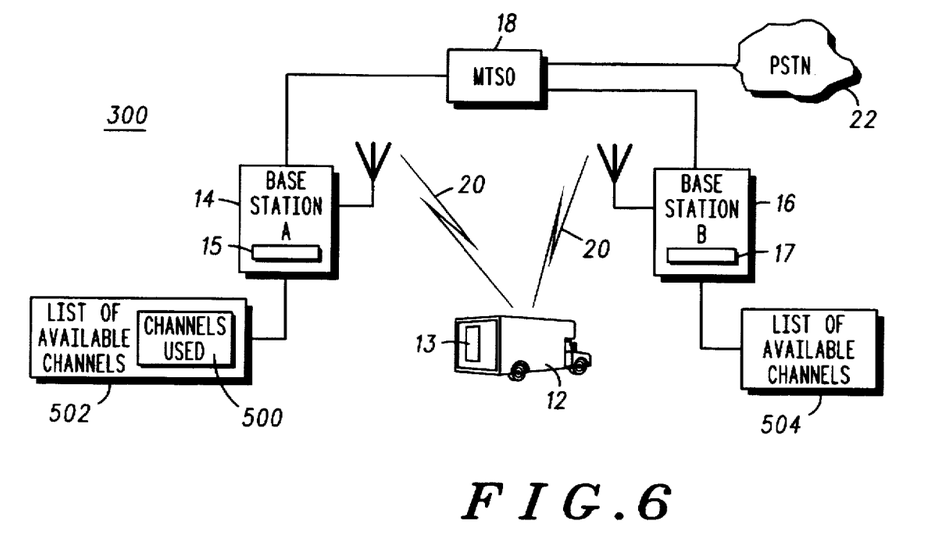
FIG. 6 depicts a soft hand-off operation for a high data rate communication signal in a DS-CDMA communication system in accordance with the preferred embodiment of the present invention.

The arbitrary nature of channel assignment for a high data rate communication signal according to the method disclosed herein is significant in numerous respects. For example, FIG. 6 illustrates a soft hand-off operation for a high data rate communication signal in a DS-CDMA communication system in accordance with a preferred embodiment of the present invention.

As shown, communication system 300 provides for simultaneous transmission of high data rate communication signal 20 to and from a mobile communication unit 12, which may be a mobile station and which includes a controller 13, through both central communication unit A 14, which may be a base station and which includes controller 15, and central communication unit B 16, which may be a base station and which also includes a controller 17.

When communication signal 20 is being established between mobile station 12 and base station A 14, signal 20 is transmitted over a group of traffic channels 500 chosen arbitrarily from a list of traffic channels 502 available for communication. In addition, mobile station 12 is supplied with a list of base stations, including base station B 16, which are most likely to be candidates for hand-off of the communication signal 20. Mobile station 12 also searches continuously for other base stations (not shown) in the area and maintains a list of all base station pilot signals (not shown) it receives which are above a certain signal strength threshold. This list of base stations created by mobile station 12 is transmitted to a mobile telephone switching office (MTSO) 18, which includes base station control capability, whenever it is requested, or whenever the list changes. MTSO 18 maintains a connection to the public switched telephone network (PSTN) 22.

Upon command from MTSO 18 via base station A 14, mobile unit 12 begins tracking base station B 16, so that communication signal 20 from mobile unit 12 is received by both base station A 14 and base station B 16. Thus, base station B 16 must generally assign the same number of traffic channels to track communication signal 20 from mobile station 12 as base station A 14 has assigned to communication signal 20. Assuming base station B 16 has a sufficient number of channels available, communication signal 20 will almost certainly be continued at its existing data rate after hand-off to base station B 16, because base station B 16 is able to assign channels to the communication signal 20 from a list 504 of its available channels. The assignment of traffic channels at base station B 16 may also be performed arbitrarily.

To ensure that traffic channels are time and data synchronized at both base station A 14 and base station B 16, traffic channel pairing information is transmitted via communication signal 20 from base station A 14 to mobile station 12 before mobile station 12 begins tracking base station B 16. Traffic channel pairing may be performed by pairing the lowest number traffic channel utilized by one base station to the lowest number traffic channel used by the other base station.

Base stations A 14 and B 16 forward communication signal 20, along with a quality index, to MTSO 18. MTSO 18 may terminate one of the dual linkages between mobile station 12 and base station A 14 or base station B 16 based on a comparison of the signals 20 received from each base station 14, 16.

For example, the link between mobile station 12 and base station B 16 may be severed by MTSO 18 if mobile station 12 returns to an area surrounding base station A 14, the connection between mobile station 12 and base station A 14 may be broken in favor of the connection between mobile station 12 and base station B 16 if mobile station 12 travels closer to base station B 16, or MTSO 18 may order mobile station 12 to begin tracking another base station entirely. Thus, alternate base stations simply take turns servicing a mobile station when one base station is out of range, another joins the group serving that mobile station.

The principles of the present invention which apply to cellular-based communication systems also apply to other types of communication systems, including but not limited to personal communication systems, trunked systems, satellite communication systems and data networks. Likewise, the principles of the present invention which apply to all types of radio frequency channels also apply to other types of communication channels, such as RF signaling channels, electronic data buses, wireline channels, optical fiber links and satellite links.

It will further be apparent that other and further forms of the invention may be devised without departing from the spirit and scope of the appended claims and their equivalents, and it will be understood that this invention is not to be limited to the specific embodiments shown.

We claim:

1. A method for transmitting a communication signal having a data rate over a plurality of spread spectrum traffic channels, comprising:
   (a) determining a first number of traffic channels required to transmit the communication signal at the data rate;
   (b) determining a second number of traffic channels available for transmitting the communication signal;
   (c) comparing the first number of traffic channels to the second number of traffic channels;
   (d) selecting, in response to the comparison of the first number of traffic channels to the second number of traffic channels, a first traffic channel for transmitting a first portion of the communication signal, the first traffic channel being selected from the second number of traffic channels available for transmitting the communication signal; and
   (e) selecting a second traffic channel for transmitting a second portion of the communication signal, the second traffic channel being selected from the second number of traffic channels available for transmitting the communication signal, the selection of the first traffic channel being non deterministic of the selection of the second traffic channel.

2. The method according to claim 1, further comprising the steps of:
   (f) spreading the first portion of the communication signal with a first code;
   (g) spreading the second portion of the communication signal with a second code, the first and second codes being substantially orthogonal;
   (h) combining the first portion of the communication signal and the second portion of the communication signal to form a modulated communication signal; and
   (i) transmitting the modulated communication signal.

3. The method according to claim 1, further comprising the steps of:
   modifying the data rate of the communication signal when the first number of traffic channels is greater than the second number of traffic channels; and
   repeating steps (a) through (e).

4. The method according to claim 1, further comprising the steps of:
   modifying the data rate of the communication signal if a transmission condition of the communication signal changes; and
   repeating steps (b) through (e).

5. The method according to claim 4, wherein the transmission condition of the communication signal changes based on a number of bits of the communication signal which are available for transmission.

6. The method according to claim 4, wherein the transmission condition of the communication signal changes based on a quality of the communication signal.

7. The method according to claim 4, wherein the transmission condition of the communication signal changes when the communication signal is handed off.

8. The method according to claim 1, wherein the first traffic channel is selected arbitrarily.

9. The method according to claim 1, wherein the second traffic channel is selected arbitrarily.

10. A spread spectrum communication system comprising:
    a first central communication unit responsive to a mobile communication unit over a first plurality of traffic channels; and
    a first controller associated with the first central communication unit operable for assigning a first group of traffic channels for transmitting and receiving a communication signal, the first group of traffic channels comprising a first traffic channel and a second traffic channel chosen from the first plurality of traffic channels, the first traffic channel being non deterministic of the second traffic channel.

11. The system according to claim 10, wherein the first traffic channel and the second traffic channel are chosen arbitrarily from the first plurality of traffic channels.

12. The system according to claim 10, further comprising:
    a second central communication unit responsive to the mobile communication unit over a second plurality of traffic channels; and
    a second controller associated with the second central communication unit operable for assigning a second group of traffic channels for transmitting and receiving the communication signal, the second group of traffic channels comprising a third traffic channel and a fourth traffic channel chosen from the second plurality of traffic channels, the third traffic channel being non deterministic of the fourth traffic channel.

13. The system according to claim 12, wherein the third traffic channel and the fourth traffic channel are chosen arbitrarily from the second plurality of traffic channels.

14. The system according to claim 12, wherein the first traffic channel and the second traffic channel chosen from the first plurality of traffic channels are non deterministic of the third traffic channel and the fourth traffic channel chosen from the second plurality of traffic channels.

15. The system according to claim 10, wherein the communication signal is handed off between the first central communication unit and the second central communication unit.

16. The system according to claim 10, wherein the first central communication unit and the second central communication unit comprise base stations.

17. A spread spectrum communication system comprising:
    a first mobile communication unit responsive to a central communication unit over a first plurality of traffic channels; and
    a first controller associated with the first mobile communication unit operable for assigning a first group of traffic channels for transmitting and receiving a communication signal, the first group of traffic channels comprising a first traffic channel and a second traffic channel chosen from the first plurality of traffic channels, the first traffic channel being non deterministic of the second traffic channel.

18. The system according to claim 17, wherein the first traffic channel and the second traffic channel are chosen arbitrarily from the first plurality of traffic channels.

19. A method for receiving a modulated communication signal transmitted over a plurality of traffic channels in a spread spectrum communication system, each of the plurality of traffic channels being associated with a code having a plurality of groups of chips, the method comprising:
    (a) inputting the modulated communication signal to a decoder representative of a number of logical rows of adders, the number of logical rows of adders being larger than a number of traffic channels in the plurality of traffic channels;

(b) demodulating the modulated communication signal based on a first group of chips of a first code associated with at least one of the plurality of traffic channels, to form a first partially demodulated communication signal;

(c) demodulating the modulated communication signal based on a second group of chips of a second code associated with at least one of the plurality of traffic channels, to form a second partially demodulated communication signal; and (d) combining the first partially demodulated communication signal with the second partially demodulated communication signal.

20. The method according to claim 19, further comprising the steps of:

(e) outputting a first demodulated communication signal from the decoder, the first demodulated communication signal being associated with the first code; and (f) outputting a second demodulated communication signal from the decoder, the second demodulated communication signal being associated with the second code.

21. The method according to claim 20, further comprising the step of:

repeating steps (b) through (d) prior to outputting the first demodulated communication signal and the second demodulated communication signal.

22. The method according to claim 19, wherein the decoder comprises a Hadamard decoder.

23. The method according to claim 22, wherein a predetermined number of adders of the Hadamard decoder are responsive to the modulated communication signal.

24. The method according to claim 23, wherein the predetermined number of adders of the Hadamard decoder responsive to the modulated communication signal is determined by an identity of the plurality of traffic channels.

25. The method according to claim 19, wherein the first group of chips is associated with the first code and the second code.

26. The method according to claim 19, wherein the second group of chips is associated with the first code and the second code.

* * * * *